United States Patent
Moeschen-Siekmann et al.

(10) Patent No.: US 9,506,526 B2
(45) Date of Patent: Nov. 29, 2016

(54) BELT END BODY OR BELT SEGMENT END BODY

(71) Applicant: ContiTech Transportbandsysteme GmbH, Hannover (DE)

(72) Inventors: Michael Moeschen-Siekmann, Noerten-Hardenberg (DE); Achim Huels, Barsinghausen (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 14/552,276

(22) Filed: Nov. 24, 2014

(65) Prior Publication Data

US 2015/0075951 A1   Mar. 19, 2015

Related U.S. Application Data

(63) Continuation of application No. PCT/EP2013/059778, filed on May 13, 2013.

(30) Foreign Application Priority Data

May 24, 2012 (DE) .......... 10 2012 104 477

(51) Int. Cl.
 *B65G 17/00* (2006.01)
 *F16G 3/07* (2006.01)
 (Continued)

(52) U.S. Cl.
 CPC ............ *F16G 3/07* (2013.01); *B65G 15/30* (2013.01); *F16G 3/02* (2013.01)

(58) Field of Classification Search
 CPC .......... B65G 15/30; F16G 3/00; F16G 3/02; F16G 3/07; F16G 3/08; F16G 3/09

USPC .......... 198/844.1, 844.2, 846, 847; 24/33 R, 24/33 A, 33 P, 33 F, 33 L, 33 B, 33 C, 33 K, 24/33 M, 33 V, 31 F, 31 H, 31 W; 474/253, 474/255, 257

See application file for complete search history.

(56) References Cited

U.S. PATENT DOCUMENTS

| 224,951 A | 2/1880 | Redsecker et al. |
| 2,446,311 A * | 8/1948 | Traxler ................. F16G 7/00 156/140 |

(Continued)

FOREIGN PATENT DOCUMENTS

| DE | 323930 C | 9/1920 | |
| DE | WO 2012038155 A1 * | 3/2012 | ........... F16G 3/02 |

OTHER PUBLICATIONS

International Search Report dated Jul. 29, 2013 of international application PCT/EP2013/059778 on which this application is based.

*Primary Examiner* — William R Harp
(74) *Attorney, Agent, or Firm* — Walter Ottesen, P.A.

(57) ABSTRACT

A belt end body includes an arrangement for coupling together with a further corresponding belt end body. The belt end body further includes a plurality of clamping openings and clamping recesses for accommodating reinforcement members of a belt in a clamped manner. The coupling arrangement and the clamping openings lie substantially opposite each other when viewed in the longitudinal direction of the belt end body. The belt end body is configured in such a way that the unclamped segments of the clamped reinforcement members are always in the neutral phase during operation.

9 Claims, 3 Drawing Sheets

(51) Int. Cl.
*F16G 3/02* (2006.01)
*B65G 15/30* (2006.01)

(56) References Cited

U.S. PATENT DOCUMENTS

| | | | | |
|---|---|---|---|---|
| 3,105,390 A | * | 10/1963 | Wiese | B65G 15/36 24/115 R |
| 4,912,812 A | * | 4/1990 | Henn | F16G 3/00 24/31 R |
| 6,896,125 B2 | * | 5/2005 | Webster | B65G 15/52 198/844.2 |
| 7,131,532 B2 | * | 11/2006 | Webster | B65G 15/52 198/803.2 |
| 8,365,906 B2 | | 2/2013 | Moeschen-Siekmann et al. | |
| 8,770,394 B2 | * | 7/2014 | Huels | F16G 3/02 198/844.2 |

* cited by examiner

BELT END BODY OR BELT SEGMENT END BODY

CROSS REFERENCE TO RELATED APPLICATIONS

This application is a continuation application of international patent application PCT/EP2013/059778, filed May 13, 2013, designating the United States and claiming priority from German application 10 2012 104 477.5, filed May 24, 2012, and the entire content of both applications is incorporated herein by reference.

BACKGROUND OF THE INVENTION

It has long been known to use belts for conveying bulk materials and other conveyed materials. Here, the belts are installed in conveying systems, joined into an endless loop. These systems have drive rollers or drums to drive the belt, and further support, deflection or reversing rollers or drums to guide the belt, support it and also to deflect it again for example at the ends of the system, that is, to turn it around. For guiding and for driving the conveyor belt by means of this drum, contact between the underside of the belt and the upper side (surface) of the drums needs to be over as large a surface area as possible. It is also possible for the conveyed material to be unloaded at these reversal points, in that the conveyor belt is turned around over the reversing drum and so the conveyed material falls from the conveyor belt.

It is also known for the conveyor belts to be manufactured in an open configuration and only to be joined, at a connecting point, to give the endless conveyor belt of the conveying system in a subsequent manufacturing step. If a conveyor belt is made in a plurality of parts, then a plurality of open belt segments are joined at a corresponding number of connecting points to give an endless conveyor belt.

Here, it is conventional to provide the ends of the belts or belt segments with mechanical connecting elements which serve to connect the ends quickly and simply, to give a joined belt. These connecting elements are connected, on their side remote from the connecting point, to the reinforcing members of the belt or belt segment by means of clamping. The clamping is set up such that it can transmit the tensile forces permitted for the reinforcing members.

It is disadvantageous here that these mechanical connecting elements are of rigid construction by comparison with the rest of the belt and so cannot abut against the surface of the drums in the same manner as the surfaces of the belt that are of resilient construction. As a result, the reinforcing members of the belt are not in the neutral phase at these points, and the mechanical connecting points are put under bending and shear forces each time they run around a drive or deflection roller, which act in particular on the reinforcing members of the belt. In this way, the use of mechanical connecting elements represents a problem in the case of conveyor belts, since the service life of the belt is consequently reduced as a result of the fact that the reinforcing members are permanently and repeatedly kinked each time they run around.

This disadvantage has a particularly pronounced effect if the diameter of the drums is small by comparison with the length of the belt end body or belt segment end body in the longitudinal direction A. Thus, for these reasons known belt end bodies or belt segment end bodies for large deflection radii are usual. For example, when conveyor belts are used as a sliding belt for skids, however, relatively small deflection drums typically having a diameter of for example approximately 180 mm are used. With a diameter of this kind, the known constructions of mechanical connecting elements result in early breakage of the reinforcing members because of the dynamic loads.

SUMMARY OF THE INVENTION

It is an object of the present invention to provide a belt end body or belt segment end body of the type described above by means of which the service life of a belt may be increased. In particular, bending and shear forces acting on the reinforcing members of the belt are to be avoided or at least reduced by the belt end body or belt segment end body.

The belt end body assembly of the invention is for a conveyor belt configured to roll on a cylindrical body of a belt conveyor installation. The belt end body assembly includes: a belt segment having a plurality of reinforcement members having respective end portions; a belt end body having a coupling arrangement for coupling to a further, corresponding belt end body; the belt end body having a plurality of clamping openings and clamping recesses extending into the body from corresponding ones of the clamping openings for receiving respective ones of the end portions of the reinforcement members therein; each of the end portions having an innermost segment clamped in the clamping recess and an outermost segment disposed in the region of the clamping openings; the belt end body defining a longitudinal direction and the coupling arrangement and the clamping openings lying substantially opposite each other when viewed in the longitudinal direction; the belt end body having a surface for contact engaging the cylindrical body during movement of the conveyor belt; the surface having a curved depression formed therein to facilitate movement over the cylindrical body; and, at least one of the clamping openings having a widening so as to permit the unclamped outermost segment of the end portion corresponding thereto to always remain in a neutral phase as the conveyor belt moves in the conveyor installation.

Thus, the present invention relates to a belt end body or belt segment end body, which is configured such that the unclamped segments of the clamped reinforcing members are always in the neutral phase during operation.

The underlying concept of the invention is that the reinforcing members of a belt or belt segment, as for example in the case of a conveyor belt, are put under bending and shear forces and weakened as they run around drive or deflection rollers or drums. During this, the reinforcing members take up the tensile forces in the longitudinal direction A and, like the articulation points of the connection means of the belt or belt segments, are in the neutral phase of the belt or belt segment. The rigid belt end bodies or belt segment end bodies cannot be bent around the cylindrical bodies of the drive or deflection drums, with the result that as the reinforcing members run around the drive or deflection drums they are kinked in the regions where they jut out from the belt end body or belt segment end body. This load can damage the reinforcing members and reduce their service life.

According to the invention, as a result of the configuration of the clamping together with the connecting elements, the possibility of the reinforcing members kinking, shearing or bending and hence of their being weakened is eliminated. To be more precise, according to the invention this kinking of the reinforcing members is prevented in that the reinforcing members that project out of the belt end body or belt segment end body are permanently guided in the neutral phase. As a result, according to the invention kinking, shearing or bending of the reinforcing members to an extent less than the permitted radius of curvature are prevented. Further, in this way, and with a corresponding configuration of the curve-shaped hollow, there is no deflection or distortion of the tensile member at all.

According to an aspect of the invention, the surface of the belt end body or belt segment end body that is provided for rolling on cylindrical bodies of a belt conveying system has a curve-shaped hollow.

Because of this curve-shaped hollow, the belt end body or belt segment end body may abut against the surface of the drum more closely than in the case of a planar underside of the belt end body or belt segment end body. As a result of this, the belt ends or belt segment ends of the belt or belt segment undergo less kinking, or no kinking at all, as a result of the drums and hence the reinforcing members are put under smaller bending or shear forces or none at all. In other words, geometrically adapting the outer side of the connecting part to the geometry of the deflection drum has the effect of providing a support during running around which is as permanent as possible and hence of guiding the reinforcing members in the neutral phase. Moreover, by this means the possibility that the drum axis will move transversely and, associated therewith, an abrupt shear force will act on the reinforcing members as they run up and down on the drums is avoided.

This invention is particularly effective if the drums have a small diameter by comparison with the extent of the belt end body or belt segment end body in the longitudinal direction A. In other words, the spacing of the reinforcing members which jut out from the belt end body or belt segment end body and hence the action of bending and shear forces thereon is all the greater the longer the belt end body or belt segment end body in the longitudinal direction A, and the smaller the diameter of the drums.

Here, the term "curve-shaped hollow" is to be understood to mean a flattened portion on the side of the belt end body or belt segment end body by means of which the belt end body or belt segment end body can lie on the surface of the drums. The shape of this hollow corresponds substantially to the cylindrical surface of the drums and it is in contact with this surface substantially over a large surface area.

According to a further aspect of the invention, the curve-shaped hollow has a radius R which corresponds substantially to the radius R of the cylindrical body.

It is advantageous here that particularly effective guidance, over a large surface area, of the belt end body or belt segment end body around the drums is achieved if the surface of the drums and the curve-shaped hollow of the belt end body or belt segment end body abut against one another over as large a contact surface area as possible, as a result of their as far as possible identical radii.

According to a further aspect of the invention, at least one of the clamping openings has a widening.

This aspect of the present invention also has the effect that the belt ends or belt segment ends of the belt or belt segment undergo less kinking, or no kinking at all, as a result of the drums and hence the reinforcing members are put under smaller bending or shear forces or none at all. This is achieved in this case in that at least one clamping opening is made wider. This is to be understood to mean that the clamping opening increases outward in size, with the result that a reinforcing member clamped in the corresponding clamp recess can move perpendicular to the plane of the belt end body or belt segment end body. In other words, the widening of the transition region between the clamping region and the belt has the effect of always supporting the reinforcing member, as it runs up and down the drum, within the maximum permitted radius of curvature of the reinforcing member, with the result that the reinforcing members are always in the neutral phase of the belt. Further, in this way, and with a corresponding shaping of the clamping openings, there is no deflection or distortion of the tensile member at all.

If a belt or a belt segment having a belt end body or belt segment end body according to the invention is now guided around the cylindrical body of a drive or deflection drum of a conveying system, the reinforcing member can adapt to the bend around the cylindrical body in the region of the widening better than in the case of clamping without a widened clamping opening. As a result, bending and shear forces acting on the reinforcing member are avoided.

According to a further aspect of the invention, the widening of the at least one clamping opening is hyperbolic in shape.

It is advantageous, in the case of a hyperbolic or indeed conical widening, that its course is uniform and radially outwardly increasing. As a result, edges or the like in the region of the clamping opening, which could result in a load on and hence damage to the reinforcing member, are avoided.

According to a further aspect, the arrangement for coupling is formed in the manner of a hinge.

It is advantageous here that a hinge is a tried-and-tested and known mechanical connection which is provided simply and reliably at the belt ends or belt segment ends in order to provide coupling.

According to a further aspect, the arrangement for coupling is detachable in form.

It is advantageous here that the connection of the belts or belt segments may be broken again without having to destroy the connection and/or parts of the belt or belt segment. Breaking a connection in this way may for example be necessary to replace worn or damaged segments of a belt, or indeed to open a belt joined into an endless loop, in order to be able to remove it as a whole from the belt conveying system.

According to a further aspect, the belt end body or belt segment end body takes a form that is entirely integrated into the belt cross section.

Here, it is advantageous that in this way the external contour of the belt is not changed and in particular no surfaces or elements can project or jut beyond the surface of the belt, and as a result the surface of the belt can be kept as planar as possible even after integration of the belt end bodies or belt segment end bodies according to the invention. Similarly, the belt end body or belt segment end body does not project laterally beyond the dimensions of the belt.

Here, the term "entirely integrated into the belt cross section" is to be understood to mean that the dimensions of the belt in the regions where a belt end body or belt segment end body is integrated into the belt do not differ or differ only insubstantially from the dimensions in the other regions of the belt.

The present invention also relates to a belt or a belt segment made from elastomer material, having a reinforcing member layer made from mutually parallel steel cables that extend in the longitudinal direction A of the belt or belt segment, wherein each belt end or belt segment end has a belt end body or belt segment end body.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
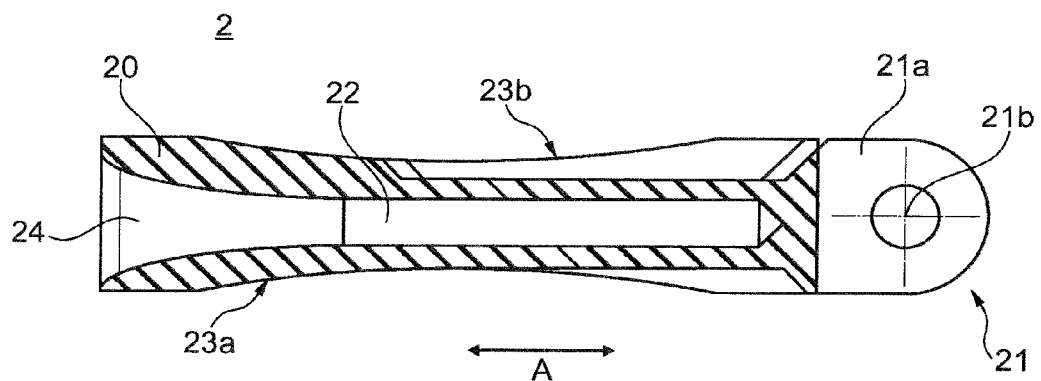
FIG. 1 shows a sectional view of a belt end or belt segment end.
Figure 2:
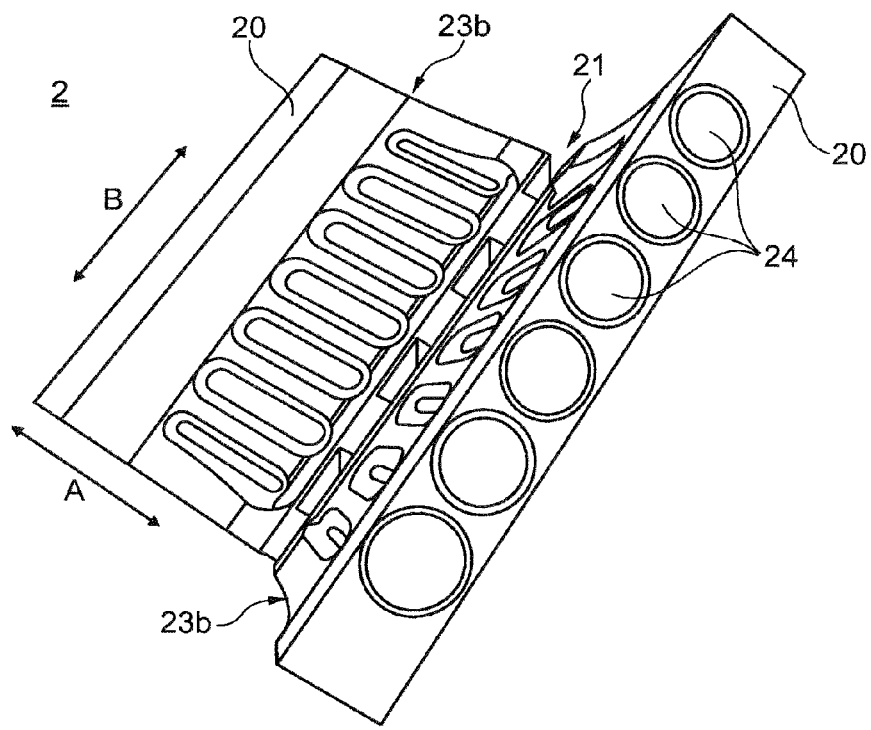
FIG. 2 shows a perspective view of two mutually connected belt ends or belt segment ends.

FIG. 1 shows a sectional view of a belt end 2 or belt segment end 2. FIG. 2 shows a perspective view of two mutually connected belt ends 2 or belt segment ends 2. The belt end 2 or belt segment end 2 has a belt end body 20 or belt segment end body 20 made from metal, preferably steel.

At its one end, the belt end body 20 or belt segment end body 20 has an arrangement 21 for hinge-like coupling to a further, corresponding belt end body 20 or belt segment end body 20. This arrangement 21 has projections 21a which are each shaped in the manner of a tooth and by means of which the two belt end bodies 20 or belt segment end bodies 20 can engage in one another in the manner of a hinge. These tooth-like projections 21a each have transverse bores 21b such that the tooth-like projections 21a may be coupled to one another by means of a coupling rod (see FIGS. 3 to 5).

At its other end, the belt end body 20 or belt segment end body 20 has a plurality of clamping openings 24 which extend substantially in the longitudinal direction A. These clamping openings 24 extend from the edge of the belt end body 20 or belt segment end body 20, in the longitudinal direction A of the belt end 2 or belt segment end 2 and into the belt end body 20 or belt segment end body 20, and there form a clamp recess 22 for receiving a reinforcing member 13, such as a steel cable 13, in clamping manner (cf. FIGS. 3 to 6). In this arrangement, the clamping openings 24 are hyperbolic or indeed conical in shape in order to allow the reinforcing members 13 to be bent without kinking in the region of the clamping openings 24. This allows the reinforcing members 13 and hence the neutral phases of the belt 1 or belt segment 1 to adapt better to bending of the belt 1 or belt segment 1, for example when running around a drum.

The belt end body 20 or belt segment end body 20 extends over a large surface area in the longitudinal direction A and transverse direction B, which corresponds to the plane of the belt 1 or belt segment 1. The belt 1 or belt segment 1 lies by means of this surface on cylindrical bodies 3 such as for example drums 3 which serve to support, deflect or drive the belt 1 or belt segment 1 (underside of the belt 1 or belt segment 1) and to receive and transport conveyed material (upper side of the belt 1 or belt segment 1). On this upper side and underside respectively, the belt end body 20 or belt segment end body 20 has a radial hollow (23a, 23b) which is adapted to the geometry of these drums. In this way, the region of the two belt end bodies 20 or belt segment end bodies 20 that are connected in the manner of a hinge can be adapted more closely to drums of this kind that have a small diameter. As a result, the belt ends 2 or belt segment ends 2 of the belt 1 or belt segment 1 undergo less kinking as a result of the drums 3 and hence the reinforcing members 13 are also put under smaller bending and shear forces.

Figure 3:
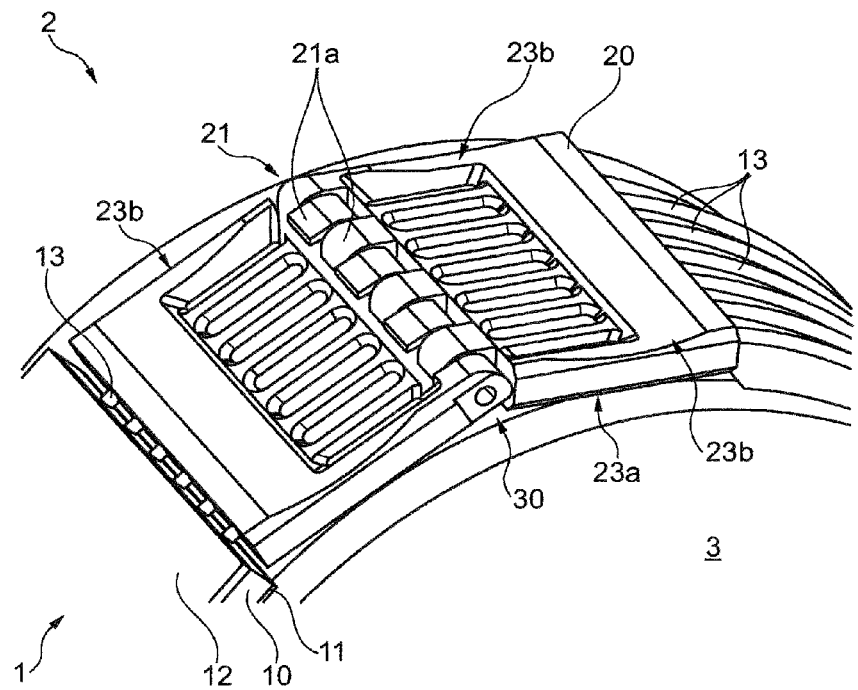
FIG. 3 shows a perspective schematic view of two belts or belt segments which are connected by means of two mutually connected belt ends or belt segment ends.
Figure 4:
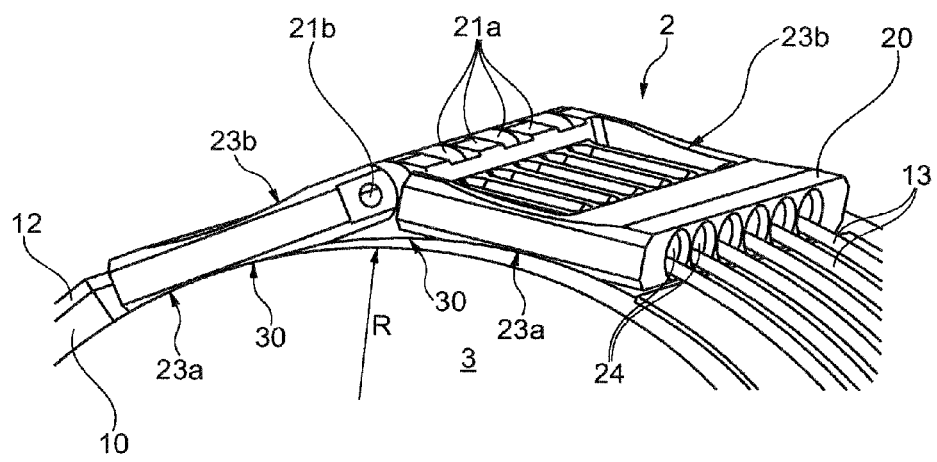
FIG. 4 shows a further perspective schematic view of two belts or belt segments which are connected by means of two mutually connected belt ends or belt segment ends.

FIG. 3 shows a perspective schematic view of two belts 1 or belt segments 1 which are connected by means of two mutually connected belt ends 2 or belt segment ends 2. FIG. 4 shows a further perspective schematic view of two belts 1 or belt segments 1 which are connected by means of two mutually connected belt ends 2 or belt segment ends 2.

In both illustrations in FIGS. 3 and 4, on the left-hand side the belt 1 or belt segment 1 is shown closed, with its structure that is visible from the outside. This includes the elastomeric base body 10 of the belt 1 or belt segment 1 in which the reinforcing members 13 are embedded. Inward in the radial direction R, that is, between the base body 10 and the underside of the belt 1 or belt segment 1, the belt 1 or belt segment 1 has a lower covering layer 11 by means of which the belt 1 or belt segment 1 may roll for example on the surface 30 of the drums 3. Outward in the radial direction R, that is, between the base body 10 and the upper side of the belt 1 or belt segment 1, the belt 1 or belt segment 1 has an upper covering layer 12 on which the belt 1 or belt segment 1 may receive and transport conveyed material.

In each case on the right-hand side of FIGS. 3 and 4, the interior of the belt 1 or belt segment 1 can be seen. Here, the reinforcing members 13 are shown exposed.

Figure 5:
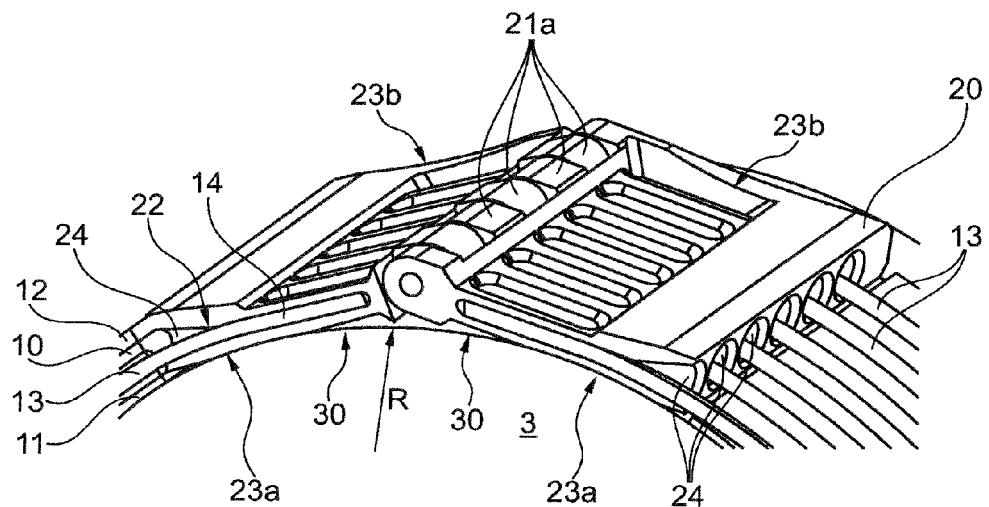
FIG. 5 shows a perspective schematic sectional view of two belts or belt segments which are connected by means of two mutually connected belt ends or belt segment ends; and, FIG. 6 shows a lateral schematic sectional view of two belts or belt segments which are connected by means of two mutually connected belt ends or belt segment ends.
Figure 6:
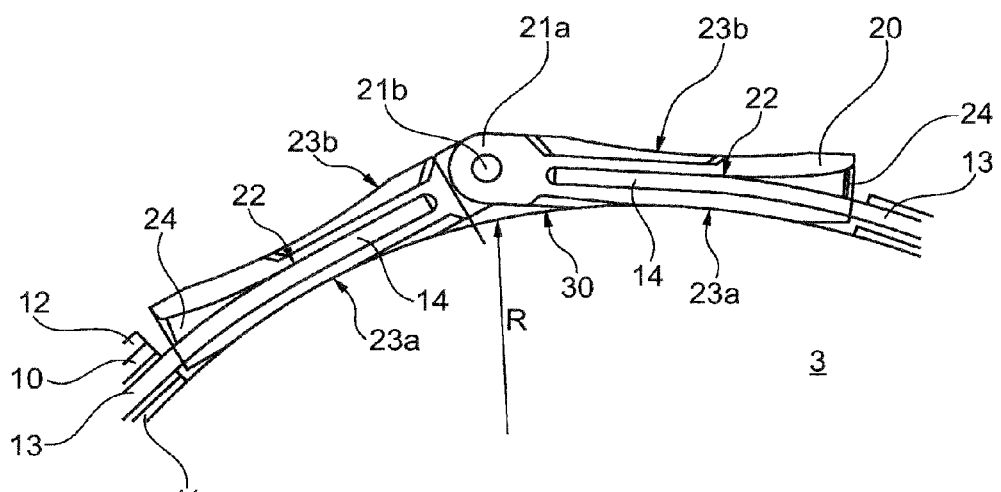

FIG. 5 shows a perspective schematic sectional view of two belts 1 or belt segments 1 which are connected by means of two mutually connected belt ends 2 or belt segment ends 2. FIG. 6 shows a lateral schematic sectional view of two belts 1 or belt segments 1 which are connected by means of two mutually connected belt ends 2 or belt segment ends 2. Here, in both drawings in FIGS. 5 and 6 show that the reinforcement elements 13 are clear of elastomer material over an end portion. FIGS. 5 and 6, the structure of the belt 1 or belt segment 1 that is visible from the outside is shown on the left, and the internal structure thereof is shown on the right.

As shown in FIGS. 5 and 6 on both sides, the reinforcing members 13 jut out from the elastomeric base body 10 and are guided through the clamping openings 24 into the interior of the respective belt end body 20 or belt segment end body 20. There, the ends of the reinforcing members 13 are held by being clamped, such that the belt end bodies 20 or belt segment end bodies 20 are securely connected to the belt 1 or belt segment 1 by way of these clamped regions 14 of the reinforcing members 13. Here, the unclamped regions of the reinforcing members 13 abut in the region of the clamping openings 24 against the inner surface thereof without being kinked or bent at the transition between the clamp recess 22 and the clamping opening 24. Moreover, the hyperbolic shape of the clamping openings 24 is selected in relation to the radius R used for the drums 3 such that no kinking or bending of the unclamped regions of the reinforcing members 13 is possible even where the reinforcing members 13 jut out from the clamping openings 24. In this way, the unclamped regions of the reinforcing members 13 are guided, without kinks or bends, in the neutral phase of the belt 1 or belt segment 1 between the clamping in the respective belt end 2 or belt segment end 2 and the elastomeric base body 10 of the belt 1 or belt segment 1. In other words, the result of this is that the unclamped regions of the reinforcing members 13 are always bent within the permitted range of the radius of curvature during operation, and the possibility of kinking, shearing or bending to an extent less than the permitted radius of curvature for the tensile members is eliminated.

As also shown in FIGS. 5 and 6, the two belt end bodies 20 or belt segment end bodies 20 lie with their respective lower radial hollow 23a on the surface 30 of the drums 3, over as large a surface area as possible. This is achieved as a result of the shape of the radial hollows 23a in that the latter are shaped with a hollow of at least substantially a radius R that corresponds to the radius R of the drums 3. As a result, contact between the radial hollow 23a and the surface 30 of the drums 3 over a large surface area, and hence improved rolling of the belt end bodies 20 or belt segment end bodies 20 on the drums 3, is achieved. If the undersides of the belt end bodies 20 or belt segment end bodies 20 were planar in nature, the result would be only a linear contact in the transverse direction B. Consequently, the entire belt end body 20 or belt segment end body 20 would be spaced further away from the surface 30 of the drums 3, as a result of which the unclamped regions of the reinforcing members 13—in particular with small drum diameters—would be kinked and bent to a greater extent. Moreover, a linear contact would put the surface 30 of the drums 3 under significantly greater load than contact over a surface area.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of Description

A Longitudinal direction of belt 1 or belt segment 1 and belt end 2 or belt segment end 2
B Transverse direction of belt 1 or belt segment 1 and belt end 2 or belt segment end 2
R Radius of cylindrical body 3
1 Belt or belt segment
2 Belt end or belt segment end
3 Cylindrical body, in particular drive, guide or support drum
10 Elastomeric base body of belt 1 or belt segment 1
11 Lower covering layer of belt 1 or belt segment 1
12 Upper covering layer of belt 1 or belt segment 1
13 Reinforcing member of belt 1 or belt segment 1 and unclamped region thereof
14 Clamped region of reinforcing member 13
20 Belt end body or belt segment end body
21 Arrangement for coupling in the manner of a hinge
21a Tooth-like projections of the arrangement 21
21b Transverse bores through the tooth-like projections 21a
14 Clamp recess for receiving a reinforcing member in clamping manner
22a Clamping region of clamp recess 22
23a First (lower) radial hollow of belt end body 20 or belt segment end body 20
23b Second (upper) radial hollow of belt end body 20 or belt segment end body 20
24 Clamping opening of clamp recess 22
30 Surface of cylindrical body 3

What is claimed is:

1. A belt end body assembly of a conveyor belt configured to roll on a cylindrical body of a belt conveyor installation, the belt end body assembly comprising:
   a belt segment having a plurality of reinforcement members embedded in elastomer having respective end portions extending from said elastomer and being free of said elastomer;
   a belt end body defining a longitudinal direction and having first and second longitudinal ends;
   said first longitudinal end having projections for coupling said belt end body to a further, corresponding belt end body;
   said belt end body defining a plane extending in said longitudinal direction and having a plurality of clamping openings formed in said second end thereof and clamping recesses extending into said belt end body from corresponding ones of said clamping openings for receiving respective ones of said end portions of said reinforcement members therein;
   each of said end portions having an innermost segment clamped in said clamping recess and an outermost segment disposed in the region of said clamping openings;
   said belt end body defining a longitudinal direction and said projections and said clamping openings lying substantially opposite each other when viewed in said longitudinal direction;
   said belt end body having a surface for contact engaging said cylindrical body during movement of the conveyor belt;
   said surface having a curved depression formed therein to facilitate movement over said cylindrical body; and,
   each of said clamping openings having a widening so as to permit the unclamped outermost segment of the end portion corresponding thereto to move perpendicularly to said plane so as to always remain in a neutral phase as said conveyor belt moves over drums in said conveyor installation thereby preventing kinking of said end portions.

2. The belt end body assembly of claim 1, wherein said cylindrical body has a radius (R); and, said curved depression has a radius essentially corresponding to said radius (R) of said cylindrical body.

3. The belt end body assembly of claim 1, wherein said widening of said at least one clamping opening is configured to have a hyperbolic form.

4. The belt end body assembly of claim 1, wherein said projections are configured as a hinge.

5. The belt end body assembly of claim 1, wherein said projections are configured so as to be detachable.

6. The belt end body assembly of claim 1, wherein said belt end body is configured to have a form that is entirely integrated into the cross section of said belt.

7. The belt end body assembly of claim 1, wherein each of said clamping openings defines a channel extending into said belt end body to transition into the clamping recess corresponding thereto with the diameter of said channel being greater than the diameter of the clamping recess.

8. The belt end body assembly of claim 7, wherein said channel has a hyperbolic shape when viewed in section taken along said longitudinal direction.

9. A belt assembly configured to roll on a cylindrical body of a belt conveyor installation, the belt assembly comprising:
   a belt defining a longitudinal direction (A) and being made of elastomer;

said belt having a plurality of mutually parallel reinforcement members embedded in said elastomer and running in said longitudinal direction (A);

said reinforcement members having respective end portions extending from said elastomer and being free of elastomer;

a belt end body extending in said longitudinal direction (A) and having first and second longitudinal ends;

said first longitudinal end having projections for coupling said belt end body to a further, corresponding belt end body;

said belt end body defining a plane extending in said longitudinal direction and having a plurality of clamping openings formed in said second end thereof and clamping recesses extending into said body from corresponding ones of said clamping openings for receiving respective ones of said end portions of said reinforcement members therein;

each of said end portions having an innermost segment clamped in said clamping recess and an outermost segment disposed in the region of said clamping openings;

said projections and said clamping openings lying substantially opposite each other when viewed in said longitudinal direction (A);

said belt end body having a surface for contact engaging said cylindrical body during movement of the conveyor belt;

said surface having a curved depression formed therein to facilitate movement over said cylindrical body; and, each of said clamping openings having a widening so as to permit the unclamped outermost segment of the end portion corresponding thereto to move perpendicularly to said plane so as to always remain in a neutral phase as said belt assembly moves over drums in said belt conveyor installation thereby preventing kinking of said end portions.

* * * * *